(12) United States Patent
Beamish et al.

(10) Patent No.: US 8,379,627 B2
(45) Date of Patent: Feb. 19, 2013

(54) WIRELESS COMMUNICATION DEVICE, INTEGRATED CIRCUIT AND METHOD OF TIMING SYNCHRONISATION

(75) Inventors: Norman Beamish, Cork (IE); Paul Kelleher, Cork (IE); Daniel B. Schwartz, Scottsdale, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 820 days.

(21) Appl. No.: 12/521,862

(22) PCT Filed: Jan. 2, 2007

(86) PCT No.: PCT/EP2007/050016
§ 371 (c)(1),
(2), (4) Date: Jun. 30, 2009

(87) PCT Pub. No.: WO2008/080634
PCT Pub. Date: Jul. 10, 2008

(65) Prior Publication Data
US 2010/0034192 A1 Feb. 11, 2010

(51) Int. Cl.
*H04J 3/06* (2006.01)
*H04L 12/28* (2006.01)
*H04L 12/56* (2006.01)

(52) U.S. Cl. .............. 370/350; 370/395.62; 370/509; 370/520

(58) Field of Classification Search .......... 370/345, 370/350, 395.62, 503–514, 520
See application file for complete search history.

(56) References Cited

U.S. PATENT DOCUMENTS

| 4,652,838 | A | 3/1987 | Nossen |
| 6,522,665 | B1 * | 2/2003 | Suzuki et al. ............ 370/471 |
| 2004/0166823 | A1 | 8/2004 | Alderton |
| 2005/0064892 | A1 * | 3/2005 | Cavin .................... 455/550.1 |
| 2006/0004938 | A1 | 1/2006 | Matthews et al. |

FOREIGN PATENT DOCUMENTS

| WO | 9708866 A | 3/1997 |
| WO | 2004030228 A | 4/2004 |

OTHER PUBLICATIONS

FOGG "DigRF Baseband/RF Digital Interface Specification" http://146.101.169.51/DigRF%Standard%20v112.pdf Feb. 2004.
International Search Report for PCT Application No. PCT/EP2007/050016 issued Sep. 10, 2007.

* cited by examiner

*Primary Examiner* — Ronald Abelson

(57) ABSTRACT

A wireless communication device comprises a first sub-system arranged to pass data to a second sub-system comprising timing synchronization logic operably coupled to a counter, such that data is sampled by the timing synchronization logic when passed to the second sub-system from the first sub-system wherein the wireless communication device is characterized in that the timing synchronization logic is arranged to determine a position of a first data frame and in response thereto initiate a counting process of the counter and determine a position of a second data frame and in response thereto determine a count value from the counting process of the counter and in response to the count value determine whether to initiate a timing advance or timing retard operation on the data being passed to the second sub-system. In this manner, the inventive concept provides the wireless communication device with a mechanism to achieve timing synchronization. In particular, the inventive concept may allow a radio frequency integrated circuit to implement timing synchronization by advancing or retarding an 'actual' signal sent from digital baseband circuits in a 3G DigRF wireless communication device.

20 Claims, 3 Drawing Sheets

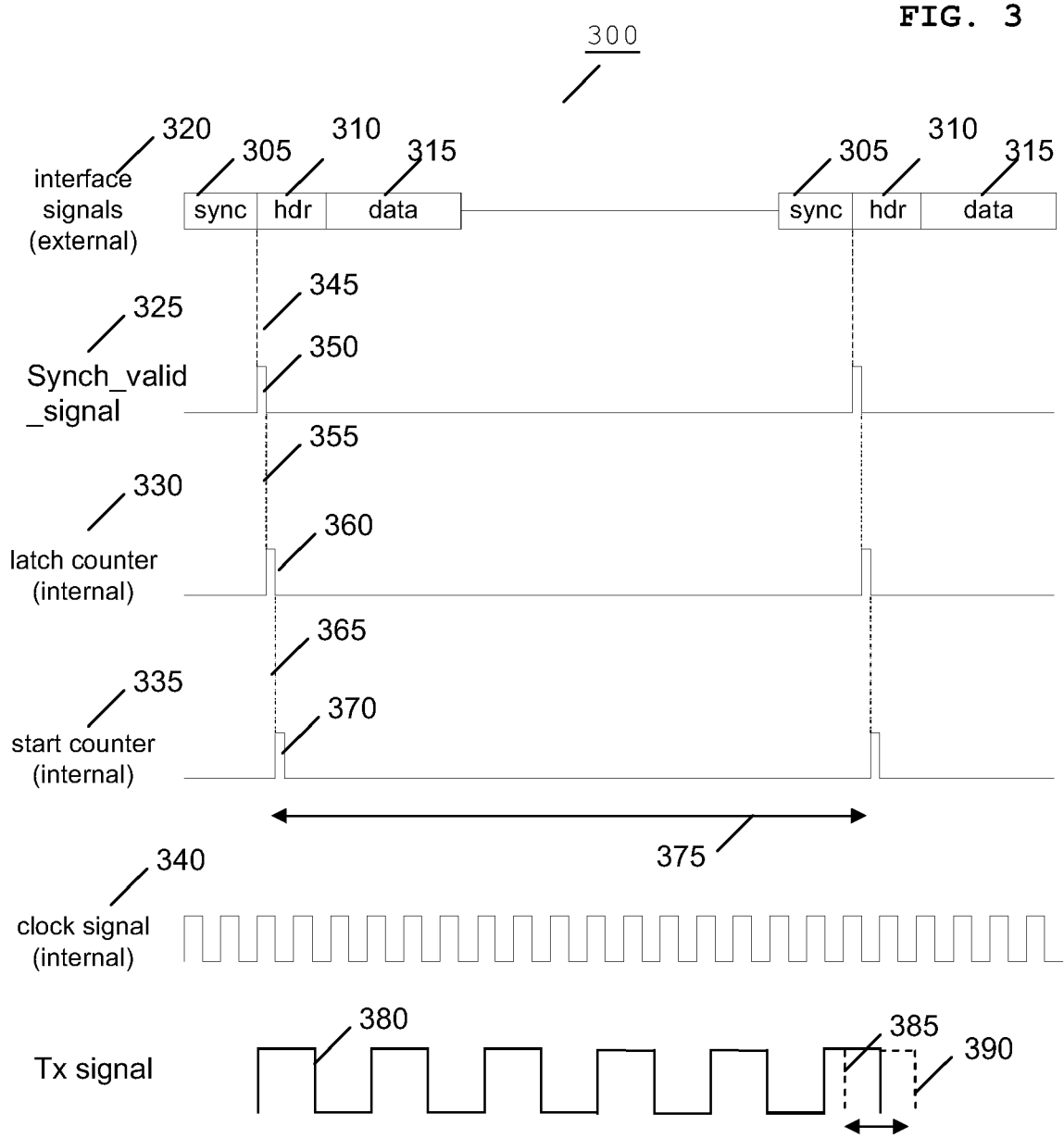

WIRELESS COMMUNICATION DEVICE, INTEGRATED CIRCUIT AND METHOD OF TIMING SYNCHRONISATION

FIELD OF THE INVENTION

This invention relates to timing synchronisation. The invention is applicable to, but not limited to, a wireless communication device, an integrated circuit therefor and a method for timing synchronisation.

BACKGROUND OF THE INVENTION

Wireless communication devices, such as mobile phone handsets, require a very high level of integration of hardware and firmware/software in order to achieve the necessary density of functionality, i.e. to realise the necessary functionality in a minimum device volume and at a minimum cost. An optimal wireless communication device design must also minimise power consumption in order to increase the battery call time and/or stand-by time.

Wireless communication devices also incorporate a number of distinct and operably coupled sub-systems, in order to provide the wide variety of functions and operations that a complex wireless communication device needs to perform. Such sub-systems comprise radio frequency power amplification functions, radio frequency integrated circuits (RFIC) comprising radio frequency generation, amplification, filtering, etc. baseband integrated circuits (BBIC) comprising audio circuits, encoding/decoding, (de)modulation logic, processing functions, etc. and memory units.

Interfaces, which are often standardised to allow commonality and increased functionality between different chip-set manufacturers and different handset manufacturers, are defined for communicating between the respective sub-systems.

In the field of mobile phones, a consortium of mobile phone manufacturers has been formed to define various sub-system interfaces, particularly interfaces between variants of second generation of cellular phones (2.xG) when migrating to cover additional, future wireless communication technologies, such as multimode transceivers additionally employing third generation (3G) wideband code division multiple access (WCDMA) technology. This consortium is known as 'DigRF', and details of the defined interfaces and functionality thereof, particularly in a multimode mobile phone scenario, can be found on their web-site at www.digrf.com.

In a 3G wireless communication system, a link is established between a mobile terminal, known as the mobile (MS), and a fixed terminal, known as the base station (BS). In order for the MS and the BS to communicate it is necessary that they have (or acquire) a common time reference. Without this common time reference, either the MS or BS will not be able to correctly receive, demodulate and decode the data being transmitted.

In 3G wireless communications, the reference clock of the MS is synchronised to that of the BS through observation of a pilot signal transmitted by the BS that contains clock frequency information. In practice, the synchronisation will not be exact and there will be some residual error between the reference clocks on the MS and the BS. Both the MS and the BS contain local reference clocks, which will typically be accurate to an absolute timing reference within some specified level of tolerance. However, there will still be a small timing error between the MS and BS internal clocks, for example due to propagation delays within timing generation logic, accuracy of a timing reference in both the MS and BS, drift over time of the local timing reference, etc. Thus, as time elapses, the accumulated error from these factors can become significant enough to degrade the performance of the communication link.

One common scheme to sporadically resynchronise the MS and BS time references is to advance or retard the local clock by one complete clock cycle. Typically the baseband controlling element of the MS will analyse the signal received from the BS and will determine whether the local MS clock is fast or slow relative to the BS clock. Upon this determination the baseband in the MS decides whether to advance or retard the time base of the Tx signal or, as is more often the case, just to do nothing. Typically, the MS timing control algorithm will estimate the accumulated timing error between the MS and BS clocks. When the accumulated timing error has reached a preset threshold, a command is sent by the baseband to advance or retard the MS time base.

A known problem is how to best determine whether a timing advance/retard operation is required and thereafter how best to advance or retard the Tx signal.

A number of approaches are known to signal such an advance/retard operation in the DigRF context. One approach is for the BBIC to generate an advance/retard command, which is used by digital baseband circuitry to delay or advance the actual Tx signal sent from the digital baseband (DBB) circuitry to the RF IC. This operation is performed at baseband if the RF transceiver does not implement a variable delay. Typically, in this case, the BBIC will contain some signal processing circuitry that is used to generate the command to be transmitted to the digital baseband circuitry. The advance/retard command can be effected by either deleting an existing sample or inserting an extra sample into the data stream.

Notably, the known prior art is focused on a baseband implementation that determines whether timing advance/retard operation is required, and thereafter a command is sent to either digital baseband circuit or RFIC logic to implement the timing advance/retard operation.

This is complex in that all control is performed by the BBIC and somewhat inflexible by being limited to a command driven implementation, which requires accommodating dedicated communication paths and signals for processor circuits to receive instructions from the BBIC and interpret these instructions to advance/retard logic.

A need therefore exists for an improved wireless communication device, an integrated circuit and a method of synchronisation therefor that may alleviate the aforementioned problems, without increasing complexity.

SUMMARY OF THE INVENTION

In accordance with aspects of the invention, there is provided a wireless communication device, an integrated circuit and a method of synchronisation therefor as defined in the appended Claims.

BRIEF DESCRIPTION OF THE DRAWINGS

Embodiments of the invention will now be described, by way of example, with reference to the accompanying drawings, in which:

FIG. 3 illustrates a timing diagram associated with the timing synchronisation mechanism employed in embodiments of the invention.

DESCRIPTION OF EMBODIMENTS OF THE INVENTION

Figure 1:
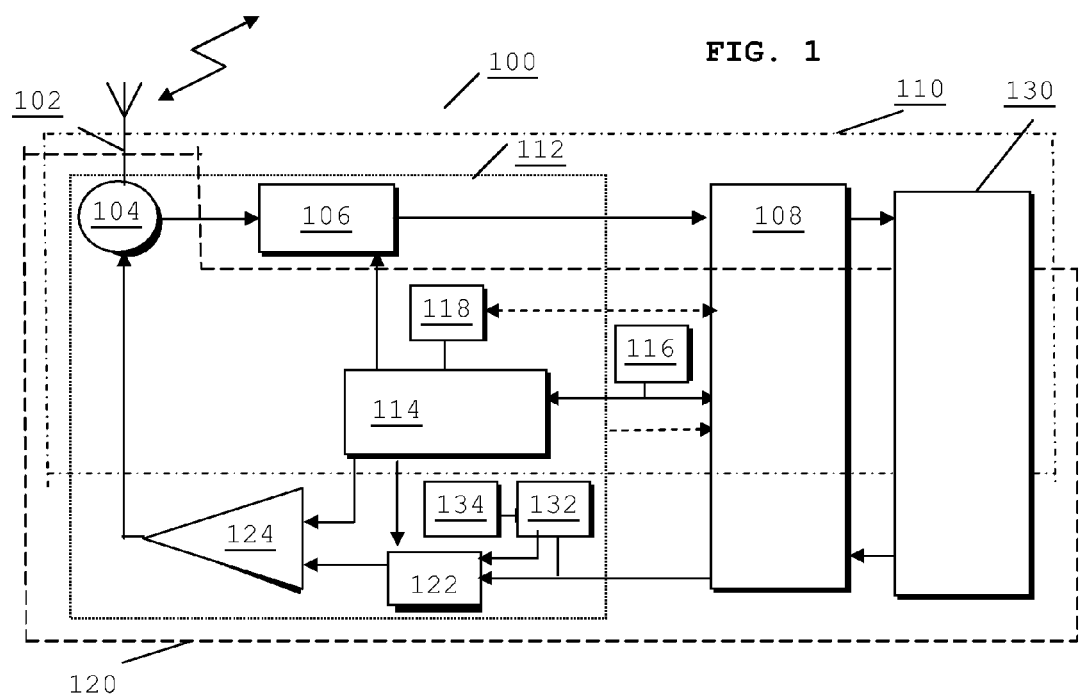
FIG. 1 illustrates a wireless communication device adapted in accordance with embodiments of the invention.

In a first aspect of the invention, a wireless communication device comprises a first sub-system arranged to pass data to a second sub-system comprising timing synchronisation logic operably coupled to a counter, such that data is sampled by the timing synchronisation logic when passed to the second sub-system from the first sub-system. The timing synchronisation logic is arranged to determine a position of a first data frame and, in response thereto, initiate a counting process of the counter and determine the position of a second data frame and in response thereto determine a count value from the counting process of the counter. In response to the count value, the timing synchronisation logic determines whether to initiate a timing advance or timing retard operation on the data being passed to the second sub-system.

In this manner, the wireless communication device is able to implement timing synchronisation in a less complex way.

In one embodiment of the invention, the timing synchronisation logic may be arranged to determine a position of a synchronisation word for a frame of data being passed to the second sub-system, for example a start of the synchronisation word.

In this manner, the wireless communication device is able to implement timing synchronisation using a repetitive and reliable portion of the data format being transferred.

In one embodiment of the invention, the count value from the counting process may be indicative of a time between successive data frames being passed to the second sub-system. In one embodiment of the invention, the timing synchronisation logic may compare the count value from the counting process to at least one threshold value and determine whether to initiate a timing advance or timing retard operation in response to the comparison.

In this manner, by use of a counter and known clock signal to track a time period related to data packets that are being sent between the two sub-systems, the timing synchronisation logic is able to implement timing synchronisation using a repetitive and reliable portion of the data format being transferred in a less complex way.

In one embodiment of the invention, the at least one threshold may be based on a clock period associated with the data being passed to the second sub-system. In one embodiment of the invention, at least two threshold levels may be applied, where a first threshold level identifies whether an advance operation should be initiated and a second threshold level identifies whether a retard operation should be initiated. In one embodiment of the invention, the first and second threshold levels may define an acceptable timing margin either side of a desired counter value that is based on a clock period associated with the data being passed to the second sub-system.

In this manner, by use of thresholds and a comparison mechanism, the wireless communication device is able to dynamically adapt the margin to be used to identify whether the two sub-systems are sufficiently synchronised.

In one embodiment of the invention, the second sub-system may be a radio frequency integrated circuit (RFIC) compliant with the 3G DigRF standard. In this manner, the RFIC may be able to implement timing synchronisation, by advancing or retarding the actual signal sent from the BBIC to the transceiver, without involvement of the BBIC.

In one aspect of the invention, an integrated circuit for a wireless communication device comprises a sub-system and timing synchronisation logic operably coupled to a counter, such that data is sampled by the timing synchronisation logic when passed to the sub-system. The timing synchronisation logic is arranged to determine a position of a first data frame and in response thereto initiate a counting process of the counter and determine a position of a second data frame. In response thereto the timing synchronisation logic determines a count value from the counting process of the counter and in response to the count value determines whether to initiate a timing advance or timing retard operation on the data being passed to the sub-system.

In a further aspect of the invention, a method of synchronisation for a wireless communication device comprises passing data from a first sub-system to a second sub-system; sampling the data; and determining a position of a first data frame from the sampled data. The method further comprises initiating a counting process in response to determining a start of a first data frame; determining a position of a second data frame; determining a count value from the counting process in response thereto; determining whether to initiate a timing advance or timing retard operation on the data being passed to the second sub-system in response to the count value Although embodiments of the invention are described with reference to a wireless 3G communication device, it is within the contemplation of the invention that the inventive concept can be applied equally to other wireless communication devices, communication standards and associated timing structures.

Referring now to FIG. 1, there is shown a simplified block diagram of a wireless 3G communication device 100 adapted to support the inventive concept of embodiments of the invention. The wireless communication device 100 includes an antenna 102 preferably coupled to a duplex filter or antenna switch 104 that provides isolation between a receiver chain 110 and a transmitter chain 120 within the wireless communication device 100. As known in the art, the receiver chain 110 typically includes receiver front-end circuitry 106 (effectively providing reception, filtering and intermediate or baseband frequency conversion). The front-end circuit is serially coupled to a baseband integrated circuit (BBIC) 108 comprising digital circuitry and signal processing logic (typically implemented as a digital signal processor (DSP)). An output from the BBIC 108 is provided to a user-interface 130, which may comprise a display, loudspeaker, etc.

The controller 114 is also coupled to the receiver front-end circuitry 106 and the signal processing logic. The controller 114 is coupled to the memory device 116 which is arranged to store operating regimes, such as decoding/encoding functions and the like. A clock circuit 118 is coupled to the controller 114 to control the timing of operations (transmission or reception of time-dependent signals) within the communication device 100. In particular, the clock circuit generates timing signals for routing to numerous components within the wireless communication device, including the RFIC 112 and the BBIC 108.

As regards the transmit chain 120, this essentially includes a user-interface 130 comprising elements such as a microphone, keypad, etc. coupled in series to a transmitter/modulation circuit 122. Thereafter, any transmit signal is passed through a RF power amplifier 124 to be radiated from the antenna 102. The transmitter/modulation circuitry 122 and the power amplifier 124 are operationally responsive to the controller 114, with an output from the power amplifier 124 coupled to the duplex filter or antenna switch 104. The transmitter/modulation circuitry 122 and receiver front-end circuitry 106 comprise frequency up-conversion and frequency down-conversion functions (not shown) within the RFIC 112.

Figure 2:
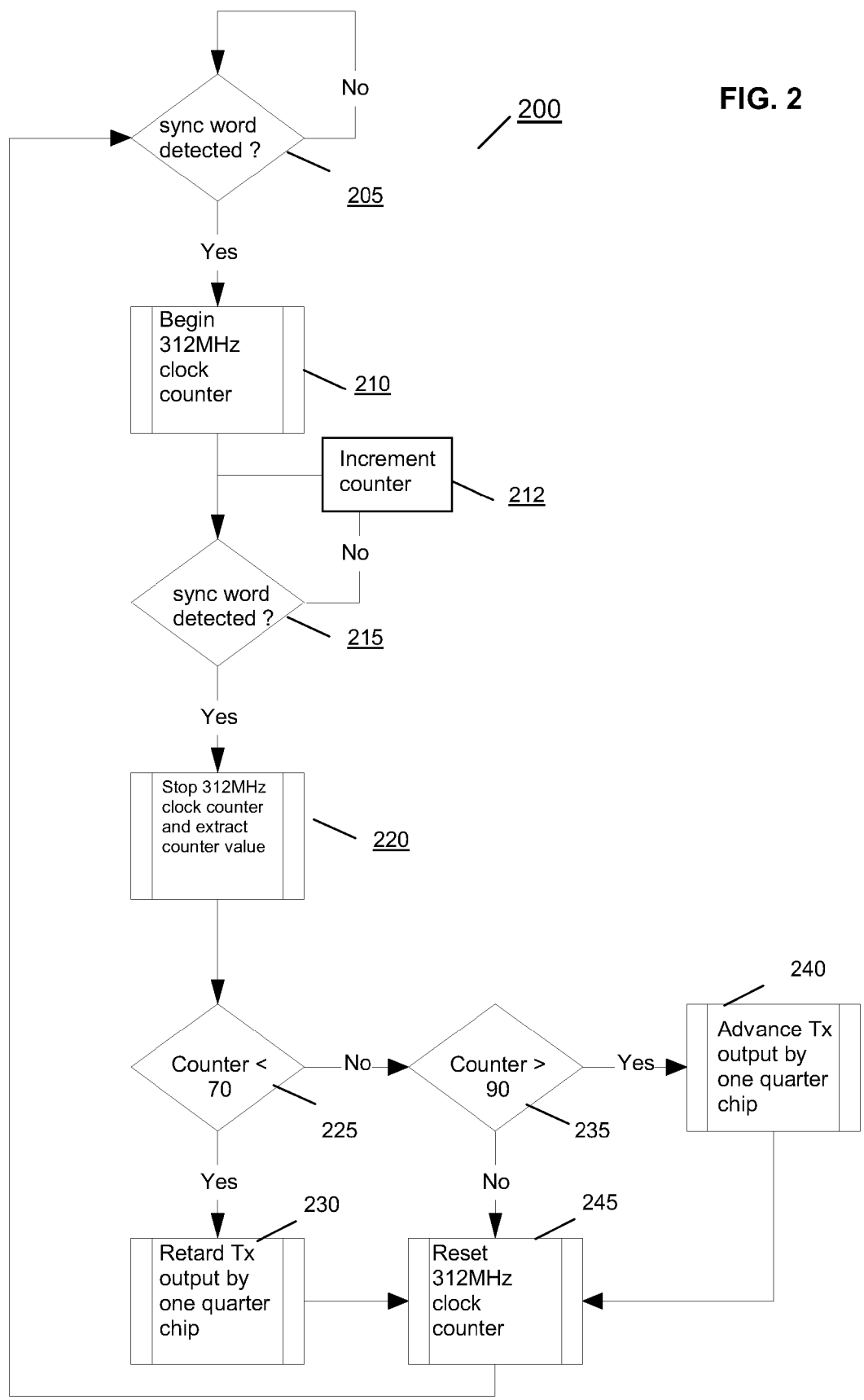
FIG. 2 is a flowchart illustrating a method of synchronisation employed in a wireless communication device in accordance with embodiments of the invention.

In accordance with embodiments of the invention, timing synchronisation logic 132 has been included within the RFIC 112 and arranged to detect successive synchronisation words within frames transmitted from the BBIC 108, as described further with respect to FIG. 2. The BBIC transmits data frames that are formatted in the style of 3G DigRF frames and typically transferred at 312 Mbps, or 6.5 MBps. It is also possible to use the 3G DigRF frame format, but transmit at a non-standard clock rate. This means that at approximately the beginning of each frame there is a 16-bit synchronisation code. Each transmitted 16-bit synchronisation code is detected by the timing synchronisation logic 132, thereby allowing the transceiver in the RFIC to detect a presence of a frame. In the context of the invention, the 3G DigRF standard may otherwise be referred to the Dual-Mode 2.5G/3G Baseband/RFIC Interface Standard.

Upon detection of the synchronisation word the timing synchronisation logic 132 transmits a synch_valid signal to a counter 134. The counter 134 in one embodiment resides in the RFIC 112 and counts the number of 312 MHz clock cycles between successive frames arriving at the RF transceiver by observing the periodicity of synch_valid signals sent from the timing synchronisation logic 132. Thus, the result of the counting procedure is used to determine whether timing synchronisation is acquired, e.g. by operating a counter at a particular clock rate and determining a count value of the clock between periodic trigger signals.

If the count value is determined as being below a first (low) threshold value, then the timing synchronisation logic 132 determines that the second of two frames, where a synchronisation word has been detected, has been advanced in time by the BBIC. Hence, a clock advance operation in the RFIC transceiver is initiated by the timing synchronisation logic 132. In one embodiment, the clock advance/retard logic (not shown) is located within (or operably coupled to) transmitter modulation logic 122. However, it is also envisaged that the clock advance/retard logic may be located anywhere within the RFIC 112 in accordance with the design considerations prevalent at the time of design.

Similarly if the count value is determined as being above a second (high) threshold value, then the timing synchronisation logic 132 determines that the second of two frames, where a synchronisation word has been detected, has been retarded in time by the BBIC. Hence, a clock retard operation in the RFIC transceiver is initiated by the timing synchronisation logic 132. Furthermore, if the count value determined as being between these two threshold values, the timing synchronisation logic 132 takes no action as it assumes that the BS and MS timing structures are sufficiently synchronised.

In embodiments of the invention, when applied to a 3G DigRF implementation, it is envisaged that a nominal advance or retard of ¼ chip length may be implemented. However, in other embodiments, it is envisaged that any other fraction of a chip length (in a Code Division Multiple Access scheme) or frame period or symbol period or bit period (in a Time Division Multiple Access scheme) may be deemed suitable. Alternatively, in some embodiments, it is envisaged that, as an accurate determination of the extent of the required timing advance/retard level can be ascertained from the counter value, the timing advance/retard value may be programmable.

In one embodiment of the invention, in order to reduce power consumption by the wireless communication unit, it is envisaged that the timing synchronisation logic may measure elapsed time between synch_valid signals using a clock that is lower than the interface clock of 312 MHz. Specifically, in order to reduce the power consumed by the counter incrementing process, it is envisaged that the rate of incrementing the counter may be reduced. For example, it is envisaged that a slower running clock, say a 156 MHz clock, or lower may be used to increment the counter rather than a 312 MHz clock. In this case, there will be less switching of circuits and, hence, the power consumption will be reduced.

Referring now to FIG. 2, a flowchart 200 illustrates a method of synchronisation employed in a communication device in accordance with embodiments of the invention. The flowchart commences with a determination on whether the transmit data sequence sent from the digital baseband IC contains a synchronisation word, in step 205. If the transmit data sequence sent from the digital baseband IC does not contain a synchronisation word, in step 205, the process loops, as shown. However, if the transmit data sequence sent from the digital baseband IC contains a synchronisation word, in step 205, the synchronisation word is used to indicate the start of a new frame/packet in the Tx data sequence.

In the RF transceiver, detection of the synchronisation word triggers a counter register in step 210 that uses the DigRF clock, say at 312 MHz or some derivative of the clock. The counter continues to increment, in step 212, until the next synchronisation word is received, by making a determination on whether the transmit data sequence sent from the digital baseband IC contains a further synchronisation word, in step 215. Again, if the transmit data sequence sent from the digital baseband IC does not contain a further synchronisation word, in step 215, the process loops, and the counter value increments in step 212. However, if the transmit data sequence sent from the digital baseband IC contains a further synchronisation word, in step 215, the 312 MHz clock counter is stopped in step 220, and the counter value extracted.

The value of the counter, once it has stopped, represents the time between successive Tx data frames. The nominal time between frames is 'T', where, say, a parameter 'D' is used as a margin parameter.

If the measured time is determined as being <T−D, in step 225, then that determination is interpreted as a command to advance the Tx signal as shown in step 230. However, if the measured time is determined as being >T+D, in step 235, then the determined value is interpreted as a command to delay the Tx signal, as shown in step 240. If the measured value is determined as being between T−D and T+D, in step 235, then the clock counter is reset in step 245 and the process loops back to step 205. In one embodiment of the invention, when a 312 MHz clock is used, a value for T='80' and a value for D='10' may be used, for exampled. In alternative embodiments, say when a different clock is used, in step 225 and 235 thresholds may be adjusted, to say a value for T='40' and a value for D='5' when a 156 MHz clock is used or a value for T='20' and a value for D='2' when, say, a 78 MHz clock is used.

Although the above embodiments have been described with reference to clock rates at 312 MHz, 156 MHz and 78 MHz, it is envisaged that the inventive concept may be implemented using any suitable clock frequency.

Furthermore, although the above embodiments have described applying a timing advance/retard operation to the Tx signal, it is envisaged that, in most cases, the timing advance/retard operation may be implemented by dropping samples to advance the timing and duplicating samples to retard the timing or through a suitable manipulation of the controlling clock.

Referring now to FIG. 3, a timing diagram 300 associated with the synchronisation employed in embodiments of the invention is illustrated. The timing diagram 300 illustrates a typical communication path 320 across the BBIC-RFIC interface, where data packets in frames are shown. The frame (packet) of data comprises a synchronisation word; comprising 16-bits 305 followed by a header 310 and the data payload 315. As shown, a first frame is sent and then some time later a second frame is sent.

Upon detection and validation of a synchronisation word at period 345 in waveform 325, the timing synchronisation logic 132 of FIG. 1 generates a synch_valid signal 350. The synch_valid signal 350 is used to latch (initiate) the counter (say counter 134 of FIG. 1) at period 355 with trigger 360. The trigger 360 is then used by the counter, as illustrated in waveform 335 to commence the counting process in response to pulse 370. The clock signal 340 facilitates the counting operation of the counter until the detection and validation of a second synchronisation word after a period 375 as shown. The counter is then reset in 335, with the counter value prior to reset used by the timing synchronisation logic 132 of FIG. 1 to determine whether a timing retard 390 or a timing advance operation 385 needs to be applied to the data signal 380 being passed between the two sub-systems, namely in one embodiment the RFIC-BBIC).

In this manner, timing advance or timing retard operations are utilised to synchronise the timing of the sub-system to an external timing source, such as transmissions from a remote BS.

It is envisaged, in embodiments of the invention that the invention concept is not limited to synch-valid signals, but may be applied to any repetitive signal with a fixed repeat time. It is also envisaged that the inventive concept is not limited to determining a start of a synchronisation word and initiating a count therefrom, but may be used with any fixed position of a data frame, for example the end of a synchronisation word, the start or end of a header, etc.

Thus, the inventive concept hereinbefore described aims to provide one or more of the following advantages over current wireless communication devices incorporating timing synchronisation:

(i) The inventive concept provides the wireless communication device with a mechanism to achieve timing synchronisation with minimal complexity.
(ii) The inventive concept allows the RFIC to implement timing synchronisation by advancing or retarding the 'actual' signal sent from the BBIC to the transceiver, without involvement of the BBIC.

In particular, it is envisaged that the aforementioned inventive concept can be applied by a semiconductor manufacturer to any integrated circuit architecture that requires timing synchronisation. It is further envisaged that, for example, a semiconductor manufacturer may employ the inventive concept in a design of a stand-alone device, or application-specific integrated circuit (ASIC) and/or any other sub-system element employing an integrated circuit to support timing synchronisation.

It will be appreciated that any suitable distribution of functionality between different functional units or controllers or clocks, may be used without detracting from the inventive concept herein described. Hence, references to specific functional devices or elements or logic are only to be seen as references to suitable means for providing the described functionality, rather than indicative of a strict logical or physical structure or organization.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Although the invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

Thus, a wireless communication device and an integrated circuit and a method of timing synchronisation therefor have been described, where the aforementioned disadvantages with prior art arrangements have been substantially alleviated.

The invention claimed is:

1. A wireless communication device comprises:
a first sub-system arranged to pass data to a second sub-system comprising timing synchronisation logic operably coupled to a counter, such that data is sampled by the timing synchronisation logic when passed to the second sub-system from the first sub-system wherein the timing synchronisation logic is arranged to determine a position of a first data frame and in response thereto initiate a counting process of the counter and determine the position of a second data frame and in response thereto determine a count value from the counting process of the counter and in response to the count value determine whether to initiate a timing advance or timing retard operation on the data being passed to the second sub-system.

2. The wireless communication device of claim 1 wherein the timing synchronisation logic is arranged to determine a position of a synchronisation word for a frame of data being passed to the second sub-system.

3. The wireless communication device of claim 1 wherein the count value from the counting process is indicative of a time between successive data frames being passed to the second sub-system.

4. The wireless communication device of claim 1 wherein the timing synchronisation logic compares the count value from the counting process to at least one threshold value and determines whether to initiate a timing advance or timing retard operation in response to the comparison.

5. The wireless communication device of claim 4 wherein the at least one threshold is based on a clock period associated with the data being passed to the second sub-system.

6. The wireless communication device of claim 4 wherein the at least one threshold is based on a clock period that is not associated with the data being passed to the second sub-system.

7. The wireless communication device of claim 4 wherein at least two threshold levels are applied, a first threshold level identifying whether an advance operation should be initiated and a second threshold level identifying whether a retard operation should be initiated.

8. The wireless communication device of claim 7 wherein the first and second threshold levels define an acceptable timing margin either side of a desired counter value that is based on a clock period associated with the data being passed to the second sub-system.

9. The wireless communication device of claim 1 wherein the second sub-system is a radio frequency integrated circuit compliant with the 3G DigRF standard.

10. An integrated circuit for a wireless communication device comprising:
a sub-system and timing synchronisation logic operably coupled to a counter, such that data is sampled by the timing synchronisation logic when passed to the sub-system wherein the integrated circuit wherein the timing synchronisation logic is arranged to determine a position of a first data frame and in response thereto initiate a counting process of the counter and determine a position of a second data frame and in response thereto determine a count value from the counting process of the counter and in response to the count value determine whether to initiate a timing advance or timing retard operation on the data being passed to the sub-system.

11. The integrated circuit of claim 10 wherein the timing synchronisation logic is arranged to determine a position of a synchronisation word for a frame of data being passed to the sub-system.

12. The integrated circuit of claim 10 wherein the count value from the counting process is indicative of a time between successive data frames being passed to the at least one sub-system.

13. The integrated circuit of claim 10 wherein the timing synchronisation logic compares the value from the counting process to at least one threshold value and determines whether to initiate a timing advance or timing retard operation in response to the comparison.

14. The integrated circuit of claim 13 wherein the at least one threshold is based on a clock period associated with the data being passed to the sub-system.

15. The integrated circuit of claim 13 wherein the at least one threshold is based on a clock period that is not associated with the data being passed to the second sub-system.

16. The integrated circuit of claim 13 wherein at least two threshold levels are applied, a first threshold level identifying whether an advance operation should be initiated and a second threshold level identifying whether a retard operation should be initiated.

17. The integrated circuit of claim 15 wherein the first and second threshold levels define an acceptable timing margin either side of a desired counter value that is based on a clock period associated with the data being passed to the sub-system.

18. The integrated circuit of claim 10 where the integrated circuit is a radio frequency integrated circuit compliant with the 3G DigRF standard.

19. A method of synchronisation for a wireless communication device comprising:
passing data from a first sub-system to a second sub-system;
sampling the data;
determining a position of a first data frame from the sampled data;
initiating a counting process in response to determining a start of a first data frame;
determining a position of a second data frame;
determining a count value from the counting process in response thereto;
determining whether to initiate a timing advance or timing retard operation on the data being passed to the second sub-system in response to the count value.

20. A storage medium storing processor-implementable instructions for controlling a signal processor to carry out the method of claim 19.

* * * * *